US007596724B2

(12) United States Patent
Markley

(10) Patent No.: US 7,596,724 B2
(45) Date of Patent: Sep. 29, 2009

(54) QUIESCENCE FOR RETRY MESSAGES ON BIDIRECTIONAL COMMUNICATIONS INTERFACE

(75) Inventor: Kyle Markley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 11/395,888

(22) Filed: Mar. 31, 2006

(65) Prior Publication Data

US 2007/0245210 A1 Oct. 18, 2007

(51) Int. Cl.
*G06F 11/00* (2006.01)

(52) U.S. Cl. ............................ 714/44; 714/30; 714/56; 714/43; 714/26

(58) Field of Classification Search .................. 714/43, 714/25, 44, 56
See application file for complete search history.

(56) References Cited

U.S. PATENT DOCUMENTS 6,539,507 B1 * 3/2003 Juenemann et al. ......... 714/726
6,654,914 B1 * 11/2003 Kaffine et al. ................. 714/43
6,971,049 B2 * 11/2005 Bakke et al. .................. 714/44
7,017,083 B1 * 3/2006 Peveling et al. ............... 714/44
7,036,129 B1 * 4/2006 Korhonen ................... 719/321
7,089,433 B2 * 8/2006 Chaiken et al. ............. 713/300
2003/0191590 A1 * 10/2003 Narayan et al. ............... 702/68
2004/0024920 A1 * 2/2004 Gulick et al. .................. 710/1
2004/0088605 A1 * 5/2004 Nakamoto et al. ............ 714/43
2004/0205393 A1 * 10/2004 Kitamorn et al. .............. 714/20
2004/0216003 A1 * 10/2004 Floyd et al. ................... 714/25
2005/0210329 A1 * 9/2005 Goss et al. .................... 714/25
2006/0104209 A1 * 5/2006 De Araujo et al. .......... 370/242
2006/0252439 A1 * 11/2006 Cai ........................... 455/515

* cited by examiner

*Primary Examiner*—Scott T Baderman
*Assistant Examiner*—Chae Ko
(74) *Attorney, Agent, or Firm*—Blakely, Sokoloff, Taylor & Zafman LLP

(57) ABSTRACT

A mechanism to obtain a quiescence state for a component coupled to a bidirectional communications interface is obtained. A transition to quiescence may be may by activating a first defeature in the component to cause messages received over a communication bus coupled between the component and another component to be ignored, and activating a second defeature in the component to prevent messages from being sent over the communication bus by the component. Operations may then be performed on the component while the defeatures are activated.

19 Claims, 4 Drawing Sheets

Set component to initial conditions 42
Activate defeature B 44
Activate defeature A 46
Perform test, diagnosis, maintenance operations 50
Deactivate defeature A 52
Deactivate defeature B 54
Emit LLR.Req 56
Receive LLR.Ack 58

QUIESCENCE FOR RETRY MESSAGES ON BIDIRECTIONAL COMMUNICATIONS INTERFACE

FIELD

The present description relates to diagnosis, test, and repair of microelectronic and semiconductor devices, and in particular to setting a device into a quiescent state using a connected communications interface in order to perform diagnosis, test, and repair.

BACKGROUND

Microprocessors and other complex controllers and hubs are coupled to other components with electrical communications interconnections. These interconnections have names such as host bus, processor bus, front side bus, north bridge bus etc. One such interconnection interface is referred to as CSI (Common System Interface from Intel Corp.). When the components are all installed and plugged in, they communicate a wide variety of different messages over these interconnections. Link layer traffic may include power management and credit return messages or flits. The link layer is also typically responsible for ensuring that messages get transmitted and for recovering messages or flits that were not received correctly. Protocol layer traffic relates to higher level processes and are more easily controlled. While the messages may be important to operation of the equipment, they may interfere with testing and diagnosis of any one of the components. A test cycle or signal may be interrupted or its effect may be changed due to a message from or to another connected component.

For some microprocessor architectures new transactions may be blocked by asserting a specific pin or signal at a specific time. Earlier Intel architectures with a front side bus (FSB), have a BNR# signal to block new transactions. Alternatively, a BPRI# signal, may be used to block symmetric agents from issuing new transactions. However, only the priority agent can assert BPRI#, reducing its usefulness. For more generalized architectures, however, such a pin may not be available. In addition, the use of a pin for this process may increase the total number of pins on a chip, adding to its cost and complexity. Further, these approaches attempt to prevent new messages from being generated. Such an approach may be unreliable as new components or functions are added that may not respond to the prevention attempt.

BRIEF DESCRIPTION OF THE FIGURES

The invention may be more fully appreciated in connection with the following detailed description taken in conjunction with the accompanying drawings, in which like reference numerals refer to corresponding parts throughout the several views of the drawings, and in which.

DETAILED DESCRIPTION

Figure 1A:
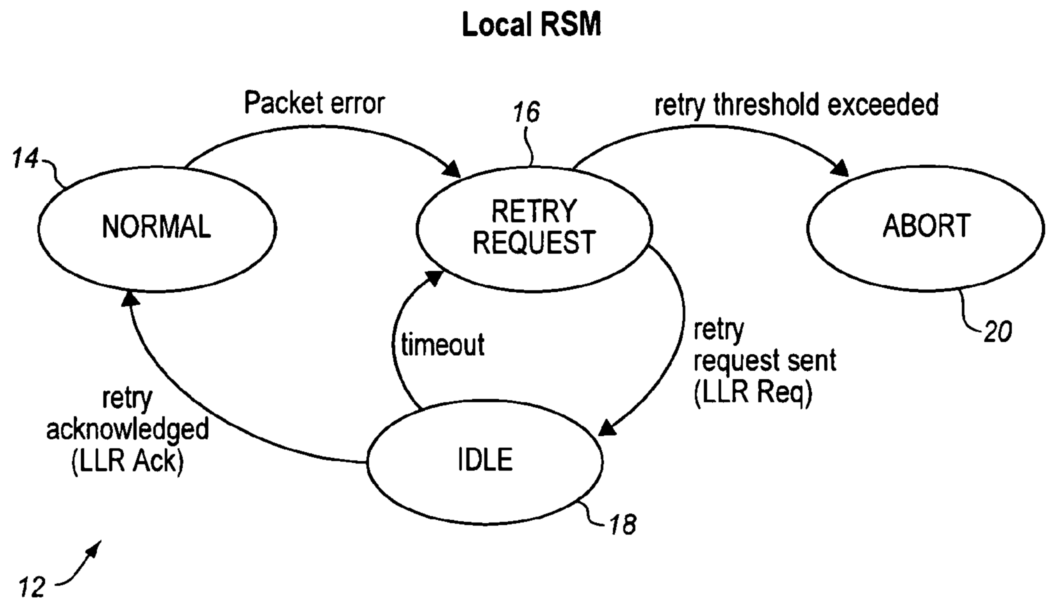
FIG. 1A is a state diagram for a local retry state machine of a bidirectional communications interface.

To achieve a quiescence state for a component, a sequence of commands may be used on a communications interface bus to cause the component to ignore traffic. Another mechanism, such as a link level retry mechanism may be used to recover important traffic that has been ignored, after the quiescent session has ended. Commands on a particular bus may also be used to cause the component to ignore traffic on that bus, rather than all traffic. Some busses may be quiesced while others are not.

In one embodiment, CSI Link Layer Quiescence (henceforth "LLQ") is a mechanism for a CSI agent to safely ignore incoming traffic for a period of time, and then to recover and resume normal operation. LLQ may be built on the link level retry hardware of CSI. While the present description is presented as applied to CSI using terminology based in CSI, it may be applied to other interfaces between microelectronic and semiconductor components.

The link layer retry hardware of CSI is built upon three basic messages. LLRReq is a link layer retry request. When a received packet on the link has errors, then the retry request is a request to its source to resent the packet. LLRAck is an acknowledgment of LLRReq that the source will send. This message will normally accompany the resending of the packet. LLRIdle may be sent by either the source or the receiver when there are no retry request or retry acknowledgment messages to be sent. While more or fewer messages may be used in any component interconnect, these messages are used in the description below.

In CSI, there is a point-to-point link for receiving and for transmitting for each component. On the receive link, each component has a Local Retry State Machine (LRSM) to ensure data integrity over the communications interface when receiving messages. On the transmit link, each component has a Remote Retry State Machine (RRSM) to ensure data integrity over the communications interface when sending messages. The states of these two state machines determine how retries are handled on the link. Retries are used whenever a message is not received correctly. Transitions between states are controlled by the received and sent packets and by a number of registers. The registers that will be used to explain the LLQ example are as follows:

Time-Out Counter, determines how long to wait for a retry acknowledgment after a retry request;

Number Retry Counter (NUM_RETRY), counts how may retry requests have been sent to determine when to stop sending retry requests;

Retry Buffer, holds copies of sent messages in case a retry request is received and the message needs to be resent;

ESeq (Expected Sequence Number) indicates the expected sequence number of the next flit that will be received (the ESeq is zeroed on reset);, WrPtr; a counter to provide an index into the retry buffer for the next flit;

RdPtr; an index into the retry buffer for a sent flit to allow sequence numbers in a retry request to be linked up to the retry buffer;

NumFreeBuf, tracks available space in the retry buffer; and

NumAck, a counter for each receipt of an error-free flit that. The count is sent to the sender of the flits from time to time to allow the sender to clear older flits from the retry buffer.

FIG. 1A shows possible states for a Local Retry State Machine 12. In normal operation the LRSM operates in a normal state 14 (RETRY_LOCAL_NORMAL) that corresponds to flits being received without error and transferred from the physical layer to higher layers for use by the component as appropriate. However, if a packet is received with errors in it, then the LRSM transitions to a retry request state 16 (RETRY_LLRREQ). In this state, retry requests are generated and sent to the source of the packet so that a new packet may be obtained to replace the one received with errors. When a retry request (LLRReq) is sent, the LRSM transitions to an idle state 18 (RETRY_LOCAL_IDLE). This is the state in which the LRSM waits for a response from the sender. The amount of time to wait is determined by the Time-Out Counter.

If the retry is acknowledged by the sender with an LLRAck message, then the state machine returns to normal. If the retry is not acknowledged within the count of the Time-Out Counter, then the LRSM transitions back to the retry request state. Another retry request will be sent and the LRSM will again transition to the idle request. If still no acknowledgement is received in time, then the cycle will repeat. Each time the LRSM transitions between the retry request state and the idle request state, the NUM_RETRY counter will increment until the system determines that the link has failed. Either the sender is not in operation or the connection has been damaged. At that point the retry threshold has been exceeded and the LRSM transitions to an abort state 20 (RETRY_ABORT).

Stated another way, the Time-Out Counter and NUM_RETRY are jointly used to manage cases where there is an error on the traffic related to link level retry itself. When a retry request is made, the Time-Out Counter starts counting. Either an acknowledgement will be received from the remote agent if everything goes well, or the counter will eventually reach a threshold. At the threshold, the NUM_RETRY Counter is incremented, the Time-Out Counter resets, and retry request is resent. If the NUM_RETRY Counter reaches a different threshold, then the retries are abandoned and the link is declared dead (abort state).

Figure 1B:
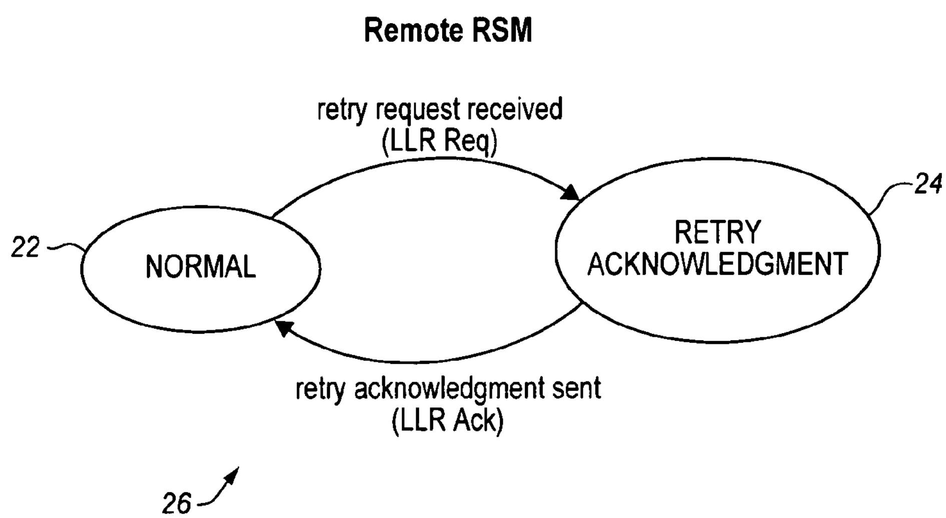
FIG. 1B is a state diagram for a remote retry state machine of a bidirectional communications interface.

FIG. 1B shows a state machine for the sending side, a Remote Retry State Machine 26 (RRSM). The RRSM has a normal state 22 (RETRY_REMOTE_NORMAL) in which messages are sent and nothing is received in reply. The normal state is the transmitter's regular operating state, as opposed to being busy servicing a retry request from the remote agent. However, when a retry request LLRReq is received, the RRSM transitions to a retry acknowledgment state 24 (RETRY_LLRACK). In this state an acknowledgment LLRAck is sent and the RRSM transitions back to the normal state. If the message still is did not get received successfully, then the RRSM may transition back to the acknowledgment state, send an acknowledgement and then transition back to the normal state. As with the LRSM, there may be additional states and additional transition conditions than those shown. The description of CSI is not intended to be complete but only sufficient to understand the operation of the LLQ mechanism.

In brief, LLQ may be used to force the LRSM to its RETRY_LLRREQ state, the RRSM to its RETRY_REMOTE_NORMAL state, the Time-Out Counter to 0, and the NUM_RETRY Counter to 0. The other states shown in FIGS. 1A and 1B will be in a quiescent state and cannot change as a result of link traffic during LLQ. For certain kinds of tests or repairs, these states may be set directly by writing to the appropriate registers. Alternatively, the other states may be allowed to enter a state through a chain of events and the status read out for analysis.

To apply LLQ, two defeatures may be used. In the context of CSI a defeature is a hook in the CSI protocol or code that allows features to be activated or deactivated when a CSI interface is not in normal operation. Defeatures (also referred to as hooks or modes) are generally provided to allow special diagnostic and test modes to be provided and controlled. Some defeatures may also be used in normal operation. For other types of communication interfaces, such a functionality may have a different name.

Defeature A forces every flit to report a CRC (Cyclic Redundancy Code) error. As a result all flits will be discarded.

Defeature B blocks the generation of LLR.Req flits. This may be done, for example by managing the flow control between the link and physical layers. The physical layer will not accept data, so the link layer will be unable to send it anything. This also keeps the LRSM in the RETRY_LLRREQ state. To control the RRSM, a second version of defeature B may be used that blocks the generation of LLR.Req flits and higher priority LLR.Ack flits. This keeps the RRSM in the RETRY_LLRACK mode.

Figure 2:
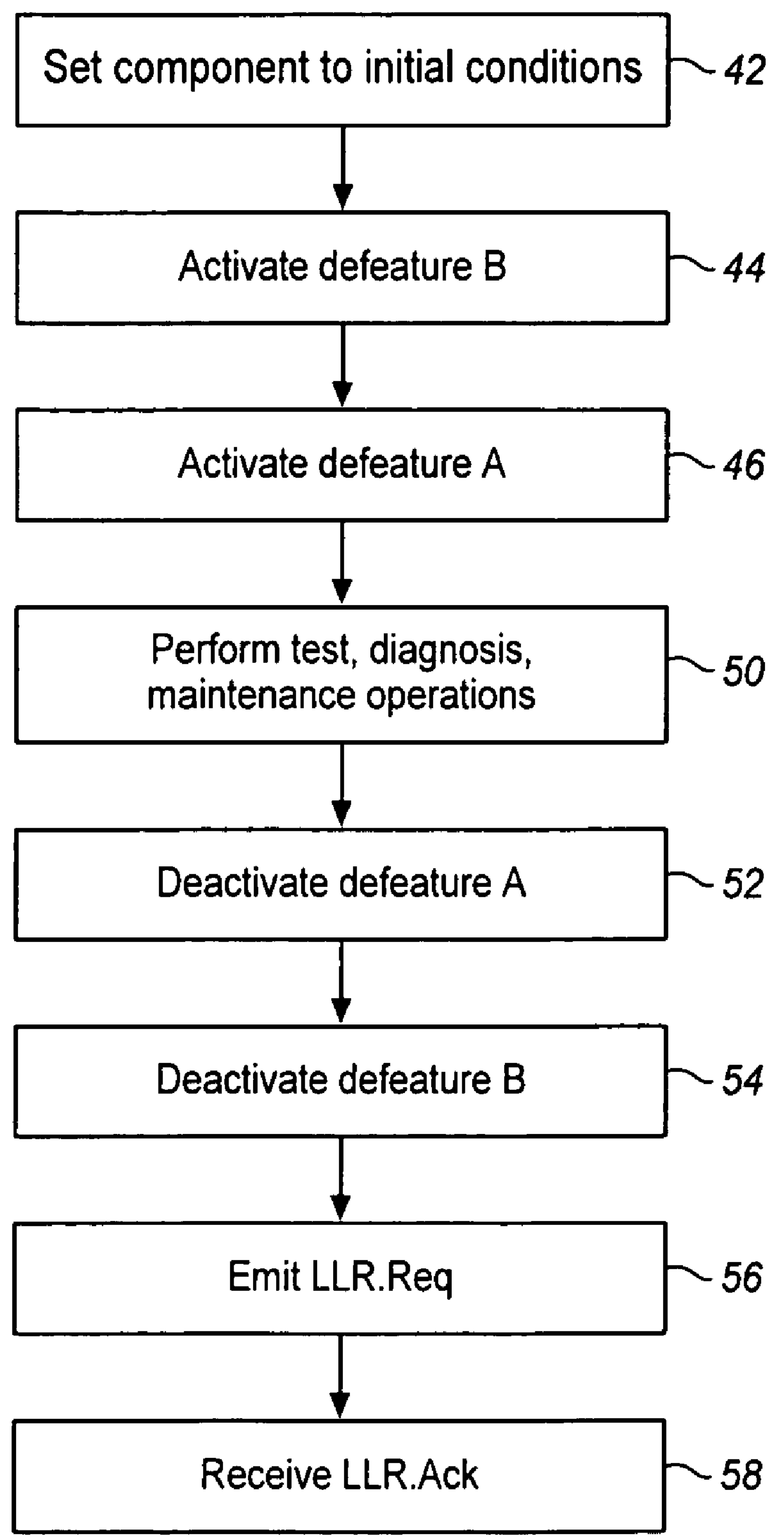
FIG. 2 is a process flow diagram of entering a quiescent state on a bidirectional communications interface according to an embodiment of the invention.

These defeatures may be used as a sequence of operations as shown, for example in FIG. 2. The operations may be performed by microcode, macrocode, or externally via a TAP (Test Access Port). The first operation at block 42 is to set the component to appropriate initial conditions. Any particular initial conditions may be selected or this operation may be skipped so the system stays in the condition it had when the sequence began. The particular initial conditions will vary depending on the particular conditions. In one particularly complex embodiment, the initial conditions may include LRSM set to a RETRY_LOCAL_IDLE state, and RRSM set to a RETRY_LLRACK state. These conditions suggest (1) the local agent has detected a link error and already sent a retry request to the remote agent, (2) the local agent has not yet received an acknowledgement of its retry request, (3) the remote agent has sent the local agent a retry request that has not yet been acknowledged.

Next, at block 44, defeature B is activated. As mentioned above, this will block LLR.Req flits, so that after some time, LRSM will eventually go to RETRY_LLREQ. The path and time taken to reach RETRY_LLRREQ depends on the initial conditions.

At block 46, defeature A may be activated, causing every received flit to be discarded. The component may be polled over a test interface or an interface to another component until the LRSM reaches RETRY_LLRREQ. The polling may be done with microcode, macrocode, or any of a variety of different test tools. The component has then entered quiescence. At block 50, any desired tests or other procedures may be performed. The tests may be for design, quality assurance, analysis, interoperability, debugging, or maintenance among other purposes. As mentioned above a second version of defeature B which block LLR.Ack. This will also drive RRSM not only into quiescence but also into a known state. This may be useful for certain kinds of tests.

When the tests are completed, defeature A may be deactivated at block 52. Defeature B may be deactivated at block 54. The defeatures may also be deactivated simultaneously depending on the application. This allows LLR.Req to be emitted again at block 56. LRSM will go to RETRY_LOCAL_IDLE, and the Time-Out counter will again begin incrementing. In response to the LLR.Req, LLR.Ack will be received at block 58 from any other components that attempted to send a message during the quiescence, bringing LRSM to RETRY_LOCAL_NORMAL and zeroing the Time-Out and retry counters. At this stage the component will have fully recover and entered a normal operational state again.

The combination of defeatures B and A reliably causes the LRSM to reach RETRY_LLRREQ. If LRSM begins in RETRY_LOCAL_NORMAL, the CRC errors generated by defeature A will transition it to RETRY_LLRREQ. If LRSM begins in RETRY_LOCAL_IDLE, the Time-Out mechanism will transition it to RETRY_LLRREQ. If LLR.Ack is received in RETRY_LOCAL_IDLE, it will not be recognized because every flit appears to have a CRC error.

The combination of defeatures B and A in the present example do not necessarily cause the RRSM to reach a particular state. If RRSM begins in RETRY_LLRACK, the transmission of an LLR.Ack flit will transition it to RETRY_REMOTE_NORMAL. If defeature B only blocks LLR.Req flits then the LLR.Ack flits, which are of higher priority than the LLR.Req flits will still be sent. Once in the RETRY_REMOTE_NORMAL state, the RRSM may remain in RETRY_REMOTE_NORMAL because the CRC errors generated by defeature A will prevent the recognition of any LLR.Req flit. On the other hand, if defeature B also block the LLR.Ack flit, then the RRSM will remain in RETRY_LLRACK. The choice of defeature B may be used to determine whether to control the state of the RRSM.

The combination of defeatures B and A also reliably cause the Time-Out Counter to reach 0 because the Time-Out Counter will be reset when the LRSM transitions to RETRY_LLRREQ.

The NUM_RETRY Counter will be reset to 0 as a consequence of ending LLQ when the LRSM transitions to RETRY_LOCAL_NORMAL. Because the Time-Out counter does not increment in RETRY_LLRREQ, it will not repeatedly reach its threshold and cause the NUM_RETRY Counter to increment to the point where the LRSM would transition to RETRY_ABORT. In other words, using RETRY_LLRREQ prevents the link from timing out.

Figure 3:
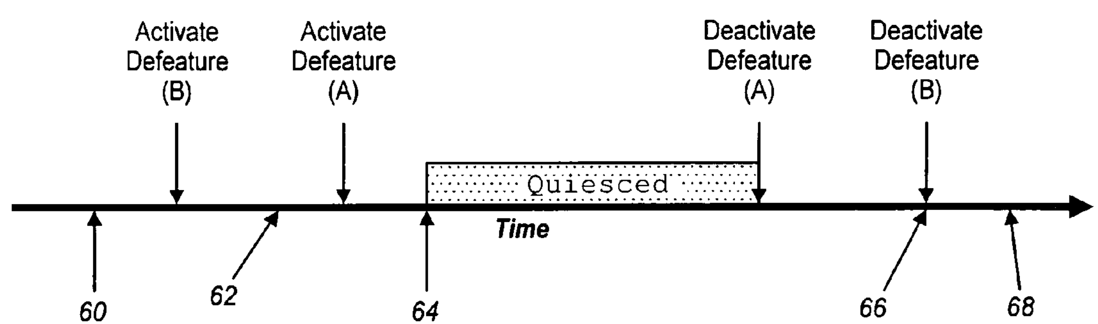
FIG. 3 is a timing diagram of enter entering a quiescent state on a bidirectional communications interface according to an embodiment of the invention.

FIG. 3 shows a timeline that illustrates a complex scenario of LLQ usage, that of initiating an LLQ while the link level retry hardware is already processing link errors on both directions of the link. At each step, the states of various registers of the link level retry hardware are shown.

At point 60, the initial conditions are established. In the present example, these conditions correspond to

LRSM: RETRY_LOCAL_IDLE

RRSM: RETRY_LLRACK

Time-Out Counter: x

NUM_RETRY Counter: y

At point 62, defeature B has been activated. so LLR.Req is blocked. After a settling time, the Time-Out Counter's threshold has been reached and the conditions correspond to:

LRSM: RETRY_LLRREQ

RRSM: RETRY_LLRACK

Time-Out Counter: 0

NUM_RETRY Counter: y+1

At point 64 defeature A has been activated, so all flits are discarded as erroneous. LLR.Req is still blocked so Retry Buffer flits are blocked. LLR.Ack may be blocked depending on the choice of defeature B. The component is in quiescence and the conditions correspond to:

LRSM: RETRY_LLRREQ

RRSM: Uncertain, RETRY_LLRACK

Time-Out Counter: 0

NUM_RETRY Counter: y+1

At point 66, the testing is ended and the component is moved out of quiescence by deactivating defeature A and defeature B. LLR.Req is no longer blocked, so flits may be transmitted from the Retry Buffer and received flits are not discarded. As the Time-Out Counter begins incrementing, the conditions correspond to:

LRSM: RETRY_LOCAL_IDLE

RRSM: RETRY_REMOTE_NORMAL

Time-Out Counter: 0

NUM_RETRY Counter: y+1

At point 68, the system is stabilized to an operational state as LLR.Ack is received. The conditions correspond to:

LRSM: RETRY_LOCAL_NORMAL

RRSM: RETRY_REMOTE_NORMAL

Time-Out Counter: 0

NUM_RETRY Counter: 0

The timeline of FIG. 3 is provided as a particularly complex example. The initial conditions as well as the states described may be modified to suit other applications or other communications interfaces. The conditions are shown as an example to illustrate components of LLQ. Note that in the transition in and out of quiescence, traffic on the interface is not prevented. Instead the traffic is ignored using a link layer retry mechanism that in normal operation is provided for another purpose.

Because, neither defeature affects the retry buffer at the sender or the receiver's records of erroneous packets, the component may recover completely after a quiescent state. On the receive side of the bus, when defeatures A and B are deactivated, the receiver may send LLRReq for all of the packets that were received while defeatures A and B were activated. The sender may respond with LLRAck and by resending all of those packets. Similarly, on the transmit side of the bus, if any LLRReq were received from another component while the defeatures were activated, the RRSM would not have been allowed to see them. However, after the defeatures are deactivated, if LLRReq are resent, then they can be responded to from the retry buffer. This allows the component to recover to the conditions that it would be in if the LLQ mechanism had never been operated for both received flits and send flits.

LLQ may be used to reproduce the state of the link level retry hardware, and to protect states from being disturbed. LLQ may be used to send the component to a reproducible state as described above. The state machines and counters may be directly synchronized by LLQ, as described above. These states and counters do not change while quiesced and if desired the conditions of states and registers may also be controlled.

By causing inbound traffic to be ignored, LLQ insulates the component and its carefully-controlled state from other agents in the system. This may be used to protect the component from external disturbances.

Another use of LLQ is with a restartable array dump. An array dump is a postsilicon debug tool. In many applications, this tool is only able to dump many of the arrays in a manner that is non-restartable. In other words, once the array dump is taken, the system must be reset. To perform a restartable array dump it is necessary to restrict which arrays are dumped. This reduces the information available to the postsilicon debugger.

Because LLQ prevents flit traffic from disturbing the processor, the use of LLQ during array dump may allow some data structures, for example those related to CSI credit management, among others, to be included in a restartable array dump instead of being relegated only to a non-restartable array dump. The additional information available by making some arrays compatible with restartable array dump may increase debug productivity.

Microcode patches may be used to apply defeatures as well as to update microcode. LLQ may make it possible to deploy patches for applying uncore defeatures that would be unsafe to activate if CSI traffic is affecting the processor at the time it is applied. LLQ guarantees that incoming traffic will be ignored, so setting the defeature won't adversely interact with incoming traffic. The ability to reliably apply such defeatures with a microcode patch makes them available for production use rather than limiting them only to validation and debug environments.

LLQ may be used "in the field." In other words LLQ may be applied to components installed in operational equipment, that has temporarily been taken out of service for maintenance or diagnostics. LLQ is invisible to remote agents, because the only evidence of LLQ is a link level retry. This link level retry will be indistinguishable from an ordinary link error. This reduces or eliminates service disruptions or perceived problems for users of the system. In addition LLQ does not require any special software. This allows it to be used with components that are not processor. A chipset, for example, does not execute software.

Figure 4:
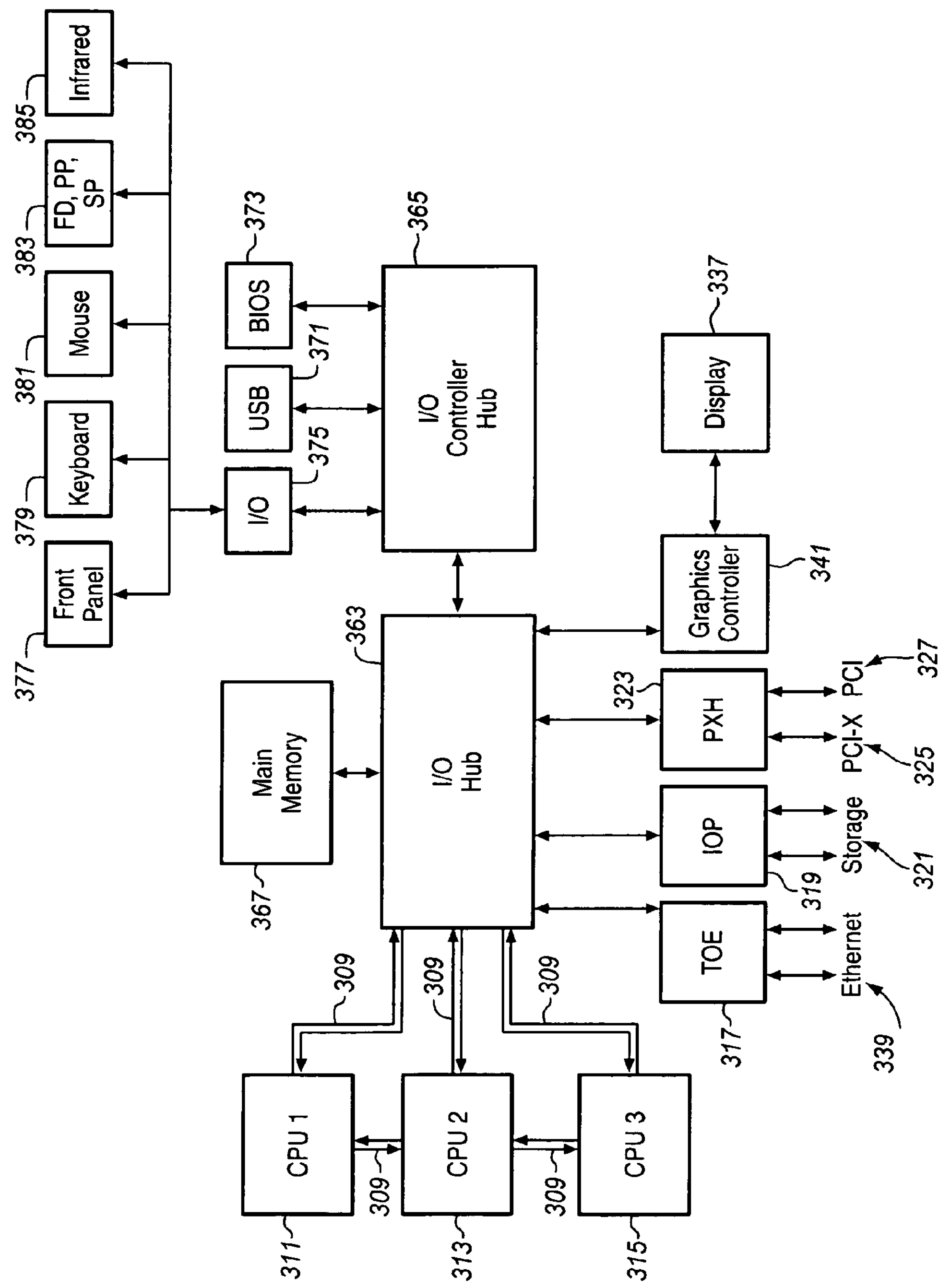
FIG. 4 is a block diagram of a computer system with bidirectional communications buses suitable for implementing embodiments of the present invention.

FIG. 4 shows an example of a computer system suitable for implementing the present invention. An IOH (Input/Output Hub), north bridge, or host controller 363 interfaces one or more CPUs (central processing unit) with memory and I/O devices and may provide a wide range of other features such as increased performance, reliability, availability and serviceability, and system management. It may include I/O clusters, a memory controller, snoop filters, and a wide range of logic for handling transactions. While the example of FIG. 3, includes a microprocessor coupled to a IOH and an ICH (Input/Output Controller Hub), either the IOH or the ICH or both or any of the functions of these chips may be incorporated into any one or more of the microprocessors. The IOH and the ICH may also be combined, in whole or in part, inside of or outside of the microprocessor.

In the example of FIG. 4, the IOH 363 has a bidirectional CSI link 309 for each of three CPUs or processor cores 311, 313, 315. More or less than one IOH, three processor cores and CSI links may be used. As shown in the diagram, CPU1 has direct link to CPU 2 and the IOH, but CPU 1, CPU 3 communicate only through CPU 2 or the IOH. An additional CSI link may be provided to allow CPU 1 and CPU 3 to communicate with each other directly. Alternatively, CSI links may be removed so that all of the CPUs communicate through one of the other CPUs or the IOH.

The IOH provides additional connectivity to other devices. There is an interface to system memory 367, such as DIMMs (Dual In-line Memory Modules) in which instructions and data may be stored, and a high speed interface, such as a PCI (peripheral component interconnect) Express. The PCI Express interface may be used to couple to a variety of different high and low speed devices. In the example of FIG. 4, six x4 PCI Express lanes are shown. Two lanes connect to a TCP/IP (Transmission Control Protocol/Internet Protocol) Offload Engine 317 which may connect to network or TCP/IP devices such as a Gigabit Ethernet controllers 339. Two lanes connect to an I/O Processor node 319 which can support storage devices 321 using SCSI (Small Computer System Interface), RAID (Redundant Array of Independent Disks) or other interfaces. Two more lanes connect to a PCI translator hub 323 which may support interfaces to connect PCI-X 325 and PCI 327 devices. Two, four or more lanes of PCI Express couple to a graphics controller 341 to render images or video on a display 337. The PCI Express interface may support more or fewer devices than are shown here. In addition, the IOH may be adapted to support other protocols and interfaces instead of, or in addition to those described.

The IOH may also be coupled, using PCI Express or another bus to an ICH. The ICH 365 offers possible connectivity to a wide range of different devices. Well established conventions and protocols may be used for these connections. Alternatively, these connections may be provided using the PCI interface 327 or another interface. The connections may include a SIO (Super Input/Output) port 375, a USB hub 371, and a local BIOS (Basic Input/Output System) flash memory 373. The SIO (Super Input/Output) port 375 may provide connectivity for a front panel 377 with buttons and a display, a keyboard 379, a mouse 381, and infrared devices 385, such as IR blasters or remote control sensors. The I/O port may also support floppy disk, parallel port, and serial port connections 383. Alternatively, any one or more of these devices may be supported from a USB, PCI or any other type of bus or interconnect. Wireless interfaces such as Bluetooth and WiFi may also be supported from any one or more of these busses.

The particular nature of any attached devices may be adapted to the intended use of the device. Any one or more of the devices, buses, or interconnects may be eliminated from this system and others may be added. For example, video may be provided on the PCI bus, on an AGP bus, through the PCI Express bus or through an integrated graphics portion of the host controller or a processing core.

It is to be appreciated that a lesser or more equipped agent communication protocol, retry state machines, retry messages, acknowledgment message, communications bus, and computer environment than the examples described above may be preferred for certain implementations. Therefore, the configuration of the signaling system and the computer system will vary from implementation to implementation depending upon numerous factors, such as price constraints, performance requirements, technological improvements, or other circumstances. Embodiments of the invention may also be applied to other types of software-driven systems that use different hardware architectures than that shown in the Figures.

While embodiments of the invention have been described in the context of an input/output hub chip coupled to a microprocessors, memory, and other interconnects, embodiments of the invention may also be applied to a wide range of other devices capable of communicating over a CSI bus. In addition, embodiments of the invention may be applied to any device communications interface that transfers data bidirectionally with a bidirectional communications interface. Embodiments of the invention may also be applied to a wide variety of components with simpler communications interfaces or test procedures In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:

activating a first defeature in a component to cause messages received over a communication bus coupled between the component and another component to be ignored;

activating a second defeature in the component after activating the first defeature and after a local retry state machine transitions to a retry request state to prevent messages from being sent over the communication bus by the component; and performing operations on the component while the defeatures are activated.

2. The method of claim 1, wherein the first defeature causes incoming messages to report an error.

3. The method of claim 2, wherein the first defeature causes incoming messages to report an error detection code error.

4. The method of claim 2, wherein the second defeature blocks the generation of retry requests in response to the incoming messages reporting an error.

5. The method of claim 1, further comprising setting the component to an initial condition before activating the defeatures.

6. The method of claim 1, further comprising setting other states of the component to desired states after activating the defeatures.

7. The method of claim 1, further comprising deactivating the first and second defeatures and allowing retry requests to be sent for the incoming messages that were ignored.

8. The method of claim 1, wherein performing operations comprises performing diagnostic tests on the component.

9. The method of claim 1, wherein the second defeatures block the generation of acknowledgments to retry request.

10. The method of claim 1, wherein the second defeature puts a transmission state machine in a known state.

11. An article comprising a machine readable medium having data stored thereon that when operated on by the machine cause the machine to perform operations comprising:

activating a first defeature in a component to cause messages received over a communication bus coupled between the component and another component to be ignored;

activating a second defeature in the component after activating the first defeature and after a local retry state machine transitions to a retry request state, to prevent messages from being sent over the communication bus by the component; and performing operations on the component while the defeatures are activated.

12. The medium of claim 11, wherein the first defeature causes incoming messages to report an error, and wherein the second defeature blocks the generation of retry requests in response to the incoming messages reporting an error.

13. The medium of claim 12, wherein the first defeature puts a reception state machine in a known state.

14. A communicating component comprising:

a first defeature in a component to be activated to cause messages received over a communication bus coupled between the component and another component to be ignored;

a second defeature to be activated in the component to prevent messages from being sent over the communication bus by the component, the second defeatures to be activated after activating the first defeature and after a local retry state machine transitions to a retry request state; and a test interface to receive test operations for the component while the defeatures are activated.

15. The component of claim 14, further comprising a receiver state machine to control receipt of messages on the communication bus and wherein the first defeature transitions the receiver state machine to a known state and holds it there.

16. The component of claim 14, wherein the first defeature causes incoming messages to report an error.

17. A computer system comprising:

a first processor coupled to a bidirectional communications interface; and a second processor coupled to the first processor through the interface, wherein the first processor activates a first defeature to cause messages received from the second processor to be ignored, and wherein the first processor activates a second defeature after activating the first defeature and after a local retry state machine transitions to a retry request state, to prevent messages from being sent to the second processor, wherein the first processor enters a quiescence state as a result of activating the first defeature and the second defeature.

18. The system of claim 17, wherein the first defeature causes incoming messages to report an error.

19. The system of claim 18, wherein the second defeature blocks the generation of retry requests in response to the incoming messages reporting an error.

* * * * *

UNITED STATES PATENT AND TRADEMARK OFFICE

CERTIFICATE OF CORRECTION

PATENT NO. : 7,596,724 B2
APPLICATION NO. : 11/395888
DATED : September 29, 2009
INVENTOR(S) : Kyle Markley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Twenty-eighth Day of September, 2010

David J. Kappos
*Director of the United States Patent and Trademark Office*